No. 882,187.

PATENTED MAR. 17, 1908.

F. A. COLWELL.
FRICTION CLUTCH.
APPLICATION FILED MAR. 21, 1907.

2 SHEETS—SHEET 1.

WITNESSES:
E. F. Stewart
Herbert D. Lawson

Frank A. Colwell,
INVENTOR.
By C. A. Snow & Co.
ATTORNEYS

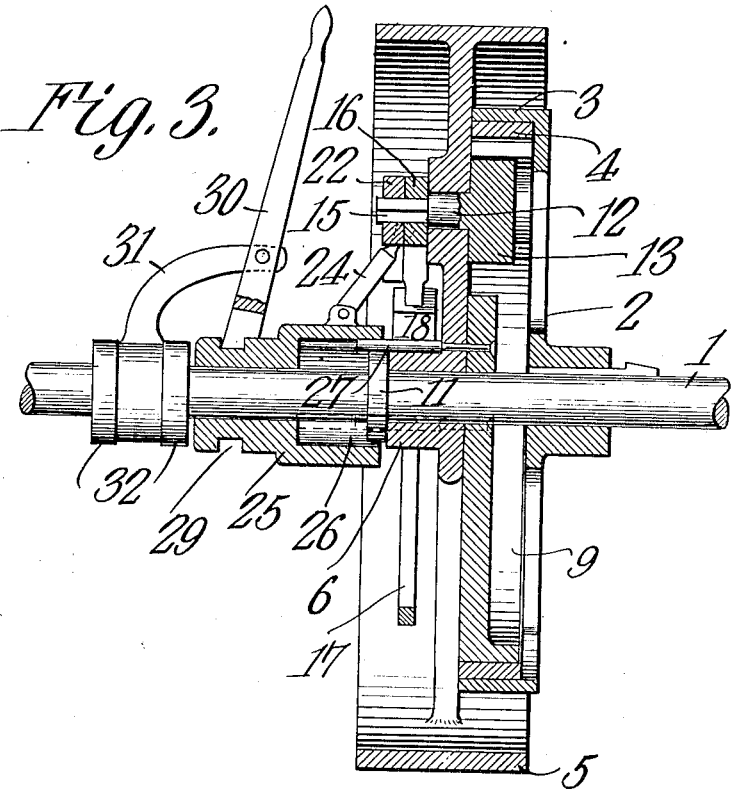
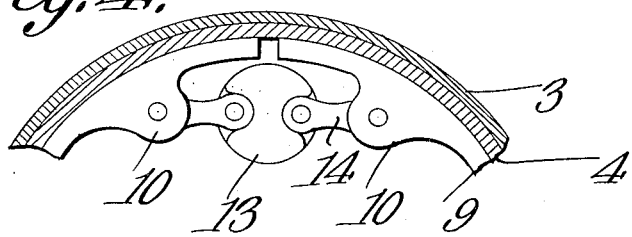

UNITED STATES PATENT OFFICE.

FRANK A. COLWELL, OF OAKESDALE, WASHINGTON.

FRICTION-CLUTCH.

No. 882,187.    Specification of Letters Patent.    Patented March 17, 1908.

Application filed March 21, 1907. Serial No. 363,576.

*To all whom it may concern:*

Be it known that I, FRANK A. COLWELL, a citizen of the United States, residing at Oakesdale, in the county of Whitman and State of Washington, have invented a new and useful Friction-Clutch, of which the following is a specification.

This invention relates to friction clutches designed for placing pulleys into or out of operative relation with the shafts on which they are mounted.

One of the objects of the invention is to provide a clutch actuated by centrifugal force for fixing a revoluble element upon a shaft, said means returning automatically to its initial position when the speed of the revoluble element is reduced to a predetermined extent.

Another object is to provide means whereby the centrifugally operated parts can be actuated manually for throwing the clutch into or out of operative position.

A still further object is to provide a friction ring of novel form having means of peculiar construction for expanding or contracting it.

With these and other objects in view the invention consists of certain novel features of construction and combinations of parts which will be hereinafter more fully described and pointed out in the claims.

In the accompanying drawings is shown the preferred form of the invention.

Figure 1:
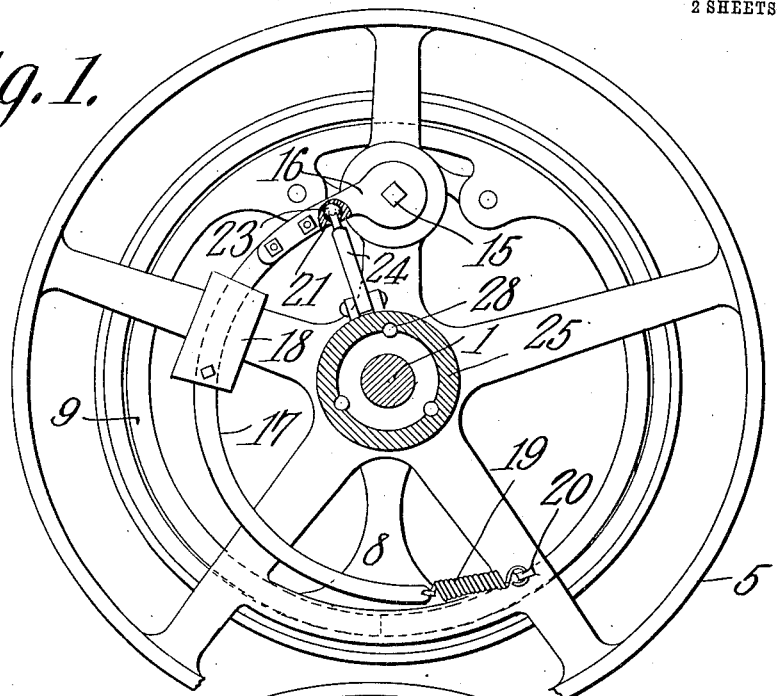
Figure 2:
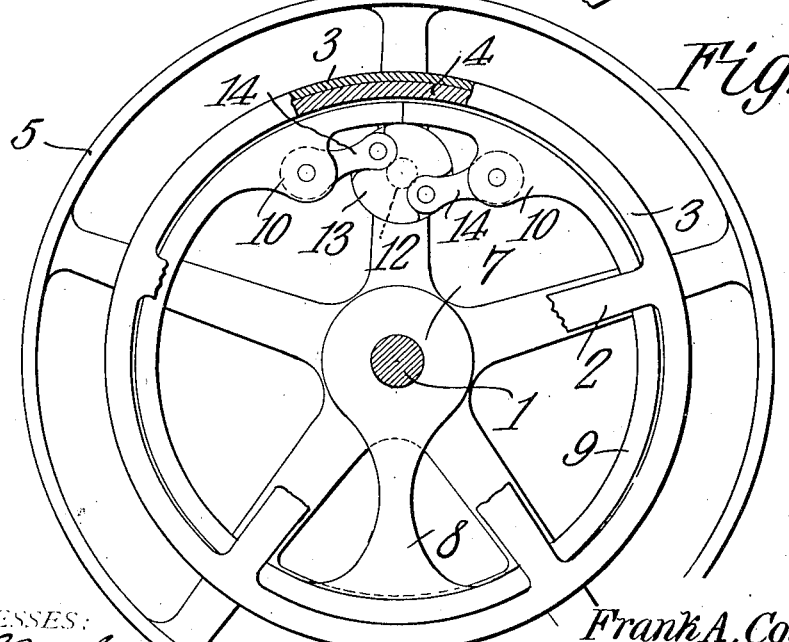

In said drawings: Figure 1 is a face view of a pulley having the present improvements applied thereto, a portion of the pulley rim being removed and the adjustable sleeve, as well as the shaft, being shown in section; Fig. 2 is an elevation of the opposite side of the pulley and friction clutch, the hub of the friction wheel being removed and a portion of the rim of said wheel being shown in section; Fig. 3 is a transverse section through the pulley and friction clutch; and Fig. 4 is a detail view of the end portions of the friction ring and the adjoining part of the friction wheel, the ends of the ring being shown spaced apart.

Referring to the figures by characters of reference, 1 is a power shaft on which is keyed or otherwise secured a friction wheel 2 the rim 3 of which extends laterally therefrom and is provided with a lining 4 of wood or other suitable material designed to be removed in the event of wear and a new lining substituted therefor.

Loosely mounted upon the shaft is a pulley 5 having a hub 6 to one end of which is secured a collar 7 having an arm 8 extending therefrom. This arm is provided with oppositely extending semi-circular members 9 constituting a friction ring the end portions of which are formed with inwardly extending ears 10. The rim 3 of the friction wheel surrounds the ring 9 and the pulley 5 is held against removal from the friction wheel by a collar 11 arranged upon the shaft 1 and constituting an abutment for one end of the hub 6.

A stem 12 is mounted to rotate in one of the spokes of pulley 5 and has a head 13 located between the ears 10 of friction ring 9. Links 14 are pivotally connected to the ears and also to the head 13 at diametrically opposite points and by rotating the head the links 14 will operate as toggles to spread the ends of the friction ring apart so that the periphery of said ring will bind against the lining of the rim 3. By turning the head in an opposite direction, the ears 10 will be drawn toward each other and the friction ring will therefore be withdrawn from engagement with the rim 3. The end portion of stem 12 is angular in cross section as shown at 15 and mounted thereon is an arm 16 to which is bolted or otherwise secured an arcuate member 17 having a weight 18 adjustably mounted thereon. The free end of member 17 is connected by means of a coiled spring 19 with an ear 20 on one of the spokes of the pulley so that said member is normally drawn inward toward the hub of the pulley and the links 14 normally maintained in the position shown in Fig. 2 thereby holding the friction ring contracted.

A socket 21 is formed in the arm 16 and is provided with a cap 22 for retaining within the socket a knob 23 formed at one end of an arm 24. This arm is pivotally connected to a sleeve 25 slidably mounted on the shaft and having an enlarged end portion 26 designed to receive the hub 6. Guide pins 27 extend from this hub and into grooves 28 in sleeve 25 so as to prevent independent rotation of the sleeve and hub, although allowing the sleeve to be adjusted toward or from the hub. An annular groove 29 is formed within the sleeve and is engaged by the forked end of a lever 30 fulcrumed upon a bracket 31 which is loosely mounted on the shaft 1 and held against displacement thereon by collars 32.

It is thought that the operation of the parts will be clearly understood. If the shaft 1 constitutes the driving element and the lever 30 is swung in one direction, the sleeve 25 will be shifted onto the hub 6 and the arm 24 will shift the arm 16 outwardly against the tension of the spring 19. This results in the spreading of friction ring 9 and the same is forced against the lining of the rotating rim 3. The pulley 5 will therefore rotate with the friction wheel 2 and the arcuate member 17 and its weight 18 will be swung outward by centrifugal force so as to maintain the parts in their adjusted positions. The pulley can be readily uncoupled from the friction wheel by shifting the sleeve 25 away from the hub 6 whereupon the arm 24 will pull inward on the arm 16 and cause the friction ring to be contracted. If the pulley 5 is the driving element the lever can be actuated to couple the shaft thereto or to uncouple it therefrom in the manner above described. If desired the spring controlled arcuate member may be dispensed with when the lever 30 is utilized and in that event the sleeve 25 and arm 24 serve to maintain the friction ring in adjusted position. By removing the cap 22 the knob 23 can be withdrawn from the socket 21 and the arm 24 and sleeve 25 dispensed with. With this construction the pulley 5 should be the driving element and while rotating it will cause the weighted member 17 to be swung outward and cause the friction ring to bind upon the rim of wheel 2 and the pulley and friction wheel will therefore rotate together until the movement of the pulley is stopped in some manner, such as by the application of more than a predetermined resistance thereto. When the parts operate in this manner the pulley will be automatically disengaged from the friction wheel 2 whenever objects become caught accidentally within the driven machinery. This is due to the reduction of centrifugal force and the proportionate reduction of frictional contact between the wheel 2 and the friction ring. The weight 18 can be adjusted on the member 17 so that the friction will be applied only when a predetermined speed of rotation is produced.

What is claimed is:

1. The combination with a shaft and a friction rim revoluble therewith; of a pulley loosely mounted on the shaft, a friction ring revoluble therewith and within the rim, a revoluble spreading device connected to the end portions of the ring, centrifugally operated means upon the pulley for actuating the spreading device, and manually operated means for rotating the spreading device within, and during the rotation of the pulley.

2. The combination with a shaft and a friction rim revoluble therewith; of a pulley loosely mounted on the shaft, an expansible friction ring within the rim and upon and movable with the pulley, a revoluble spreading device connected to the ring, centrifugally operated means upon the pulley for actuating the spreading device, and manually operated means for rotating the spreading device within, and during the rotation of the pulley.

3. The combination with a shaft and a friction rim revoluble therewith; of a pulley loosely mounted on the shaft, an expansible friction device within the rim and upon and revoluble with the pulley, a revoluble spreading device connected to the expansible friction device, a spring controlled centrifugally operated means upon the pulley for actuating the spreading device, an adjustable regulating device upon the centrifugally operated means, and manually operated means for rotating the spreading device within, and during the rotation of the pulley.

4. The combination with a revoluble rim and a pulley; of an arm secured upon the pulley, oppositely extending bowed members extending from the arm and constituting an expansible friction ring within the rim, centrifugally operated revoluble means upon the pulley for spreading said members against the rim, and manually operated means for rotating the spreading device within, and during the rotation of the pulley.

5. The combination with a revoluble rim and a pulley revoluble independently thereof; of oppositely disposed bowed members connected to the pulley and within the rim, said members constituting an expansible friction device, a revoluble head upon the pulley, link connections between the head and friction device, and centrifugally operated means for actuating the head to expand the friction device against the rim.

6. The combination with a revoluble rim, and a pulley; of an expansible friction device connected to the pulley and within the rim, a revoluble head upon the pulley, pivotal connections between the head and opposite portions of the friction device, a centrifugally operated device upon the pulley for actuating the head to expand the friction device against the rim, and means for holding the centrifugally operated device normally in a predetermined position.

7. The combination with a revoluble rim, and a pulley; of a centrifugally operated expansible friction device connected to the pulley and within the rim, a revoluble head upon the pulley, pivotal connections between the head and opposite portions of the friction device, and manually operated means for actuating the head to withdraw the friction device from the rim.

8. The combination with a revoluble rim, a shaft extending therefrom and connected thereto, and a loose pulley upon the shaft; of a centrifugally operated expansible friction device within the rim and revoluble with the pulley, a head upon the pulley, pivotal connections between the head and opposite portions of the friction device, an arm movable with the head, a slidable element upon the shaft, and an arm pivotally connecting said element with the arm of the head.

In testimony that I claim the foregoing as my own, I have hereto affixed my signature in the presence of two witnesses.

FRANK A. COLWELL.

Witnesses:
E. M. TUCKER,
T. S. HUTCHINSON.